Figure 2:
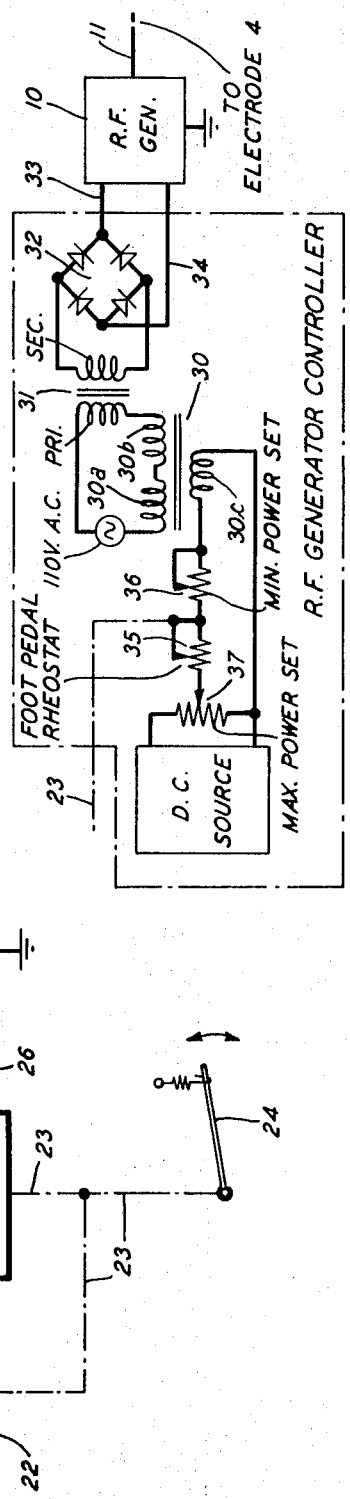

United States Patent

[11] 3,619,325

[72] Inventors George R. Hair
Clifton, N.J.;
John G. Nielsen, Wantagh, N.Y.
[21] Appl. No. 806,542
[22] Filed Mar. 12, 1969
[45] Patented Nov. 9, 1971
[73] Assignee Bondit Corp
Newark, N.J.

[54] SEALING TEMPERATURE CONTROL APPARATUS FOR CONTINUOUSLY FED SHEET MATERIAL
4 Claims, 2 Drawing Figs.
[52] U.S. Cl. .................................................. 156/380, 156/583, 156/359
[51] Int. Cl. ....................................................B29c 27/04, B29c 27/10, G05g 15/06
[50] Field of Search........................................... 156/380, 583, 359, 295, 543, 544, 320, 309

[56] References Cited
UNITED STATES PATENTS
2,998,501  8/1961  Edberg et al.................  156/380 X
3,016,085  1/1962  Gassner.........................  156/359
3,139,365  6/1964  Andrews.......................  156/295 X
3,454,442  7/1969  Heller, Jr......................  156/309 X Primary Examiner—Benjamin A. Borchelt
Assistant Examiner—D. J. Devitt
Attorney—Ryder, McAuley & Hefter ABSTRACT: Apparatus for joining sheet material is disclosed in which the material to be joined is fed from supply rolls, a dry monofilament adhesive is interfed between the materials in the area thereof to be joined, the materials and the interfed adhesive are then concurrently compressed and subjected to radio frequency heating energy whereby the adhesive melts and covers the sheet areas to be joined. The heating energy applied to the adhesive is controllably varied with the rate of travel of the material so that the adhesive is heated to the proper temperature regardless of the speed of operation of the machine.

PATENTED NOV 9 1971 3,619,325

INVENTORS: GEORGE R. HAIR
JOHN G. NIELSEN
BY
Frederick W. Padden
ATTORNEY

SEALING TEMPERATURE CONTROL APPARATUS FOR CONTINUOUSLY FED SHEET MATERIAL

BACKGROUND OF THE INVENTION

This invention relates to apparatus for joining together sheets of material. It further relates to the joining of materials with a thermoactive adhesive which is inserted between the materials to be joined, thermally activated, and compressed to form a bond between the materials to be joined. The invention further relates to apparatus for varying the amount of thermal activation of the glue in proportion to the rate at which the material to be joined passes through the bonding apparatus and past the source of thermal energy.

It is known to bond materials by the steps of:
1. Orienting the materials in the manner they are to be joined together;
2. Inserting thermoactive adhesive between the overlapped areas of the material to be joined;
3. Subjecting the adhesive to a source of thermal energy so as to soften or liquify the adhesive; and
4. Compress the materials together in the areas in which they are to be joined while the adhesive is in a soft or liquid state.

In accordance with a typical prior art bonding arrangement, sheets of material to be joined are unwound from separate supply rolls and fed into a superposed or overlapping relationship wherein the edge of one sheet overlaps a corresponding portion of the sheet to which it is to be joined. As the two sheets are so positioned, a thread of dry nonofilament thermally active glue is fed from a supply chamber and interfed between the two sheets, parallel to and intermediate the edges to be joined. The glue and the edges are then fed to apparatus which concurrently compresses together the edges and subjects them to a source of thermal energy as developed by radio frequency (RF) heating apparatus. This melts the glue and causes it to flow over the width of the overlapped edges. The advance of the sheet material is continued, the material with the melted glue advances beyond the influence of the radio frequency field, the glue promptly dries and hardens, and forms a strong unitary joint in the area defined by the overlapped edges.

Although the foregoing described prior art arrangements work reasonably well in circumstances during which the material and adhesive move past the RF heating apparatus at a uniform rate, problems have been encountered in installations where the motion or rate of travel of the material is varied such as manually in the manner analogous to that of a manually operated sewing machine. In such instances, it has been found desirable to vary the intensity of the RF as the speed of the material is varied. The reason for this is that an RF field adequate for a given material speed becomes (1) too great when the speed decreases, and (2) insufficient when the speed increases. Excessive RF energy may overheat the adhesive as well as the material to be joined. An insufficient RF field will fail to adequately melt the adhesive and the resultant bond will not be satisfactory.

BRIEF SUMMARY OF THE INVENTION

It is therefore an object of the invention to improve the bond in apparatus when the materials are bonded at a varying, rather than a uniform rate.

It is a further object to increase the applied bonding energy as the material speed increases and vice versa.

Figure 1:
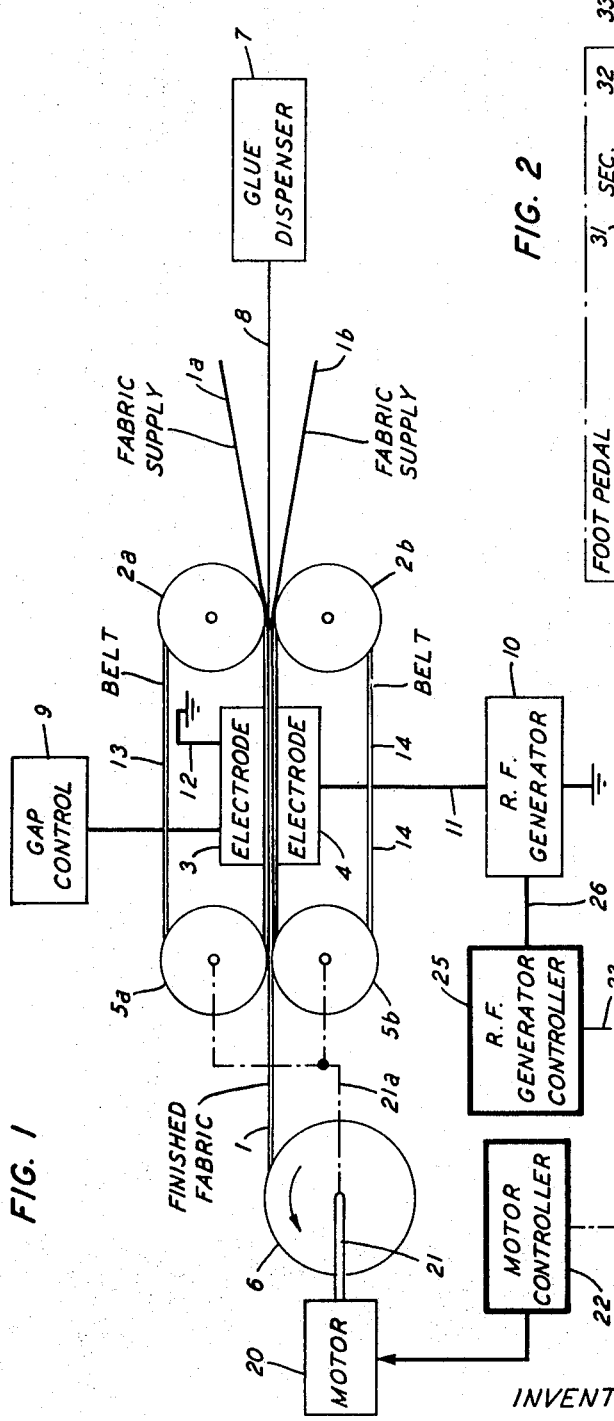

In accordance with the illustrated embodiment of the invention, provision is made for the intercoupling of the control of the motor that moves the material at the desired speed and the control of the apparatus that generates the thermal energy (RF field) so that the intensity of the thermal field is dependent on or related to the speed of travel of the material. The intensity of the thermal field increases with the speed of the material and vice versa. Consequently, the adhesive is always heated to the optimum temperature regardless of the speed of travel of the material. Detailed Description These and other objects of the invention will become apparent from a reading of the following illustrative embodiment of the invention taken in conjunction with the claims in which:

FIG. 1 illustrates the apparatus embodying the invention;
FIG. 2 illustrates the details of the apparatus that controls the intensity of the RF (thermal) field applied to the adhesive material.

With reference to FIG. 1, and in accordance with the invention, separate and relatively narrow sheets of material 1a and 1b are withdrawn from individual supply rolls (not shown), advanced to the left between rolls 2a and 2b, between electrodes 3 and 4, between rolls 5a and 5b, and then rewound as joined sheets 1 on finish roll 6. A glue dispenser 7 supplies a dry monofilament glue 8 which is positioned intermediate the edge portions of sheets 1a and 1b that are to be joined. By means of a piece of tape, for example, the leading end of glue 8 is affixed to the edge portion of either sheet 1a or 1b so that the glue remains between the edges to be joined and is interfed therebetween as the sheets advance to the left with reference to FIG. 1. The rolls 2a and 2b, by means of their spaced apart distance, initially compress the filament of glue 8 between the edges of sheets 1a and 1b. The sheet edges and the glue then pass, with the assistance of belts 13 and 14, between electrodes 3 and 4 which further compresses them with a force determined by gap control 9. Belt 13 passes between the electrodes and around the outer surfaces of rollers 2a and 5a. Belt 14 passes under belt 13, between the electrodes, and around rollers 2b and 5b. Advantageously, the belts may be on any suitable material and coated with a substance such as Teflon.

Electrode 4 is connected by conductor 11 to the ungrounded output of radio frequency generator 10. Electrode 3 is grounded via conductor 12. The resulting radio frequency field between the electrodes melts the filament of glue and the compressive force applied by the electrodes causes the melted glue to flow and cover the edges to be joined. The melted film of glue dries almost immediately and forms a permanent bond when the sheets 1a and 1b continue their leftward travel and pass beyond electrodes 3 and 4. The edge joined sheets 1 then pass between cylinders 5a and 5b and are rerolled on finish roll 6.

The sheets 1a and 1b may be positioned by their supply rolls in a side by side overlapping edge relationship and then glued in the manner described if it is desired to have the width of the joined sheets 1 as taken upon finish roll 6 be essentially equal to the sum of the width of individual sheets 1a and 1b.

Alternatively, the sheets 1a and 1b may be positioned one on top of the other, joined on their edge that passes between the electrodes, passed between rolls 5a and 5b, and rerolled on finish roll 6 so that the width of the finish sheet 1 is not greater than that of either of sheets 1a or 1b. In this case, the finish sheet 1 may subsequently be unfolded to form a wider sheet when removed from roll 6.

The arrangement so far described with reference to FIG. 1 is disclosed in complete detail in the copending application of Goldstein et al. Ser. No. 653,787, filed July 17, 1967 to which reference is hereby made and which hereby is to be understood to comprise a portion of the present disclosure to the same extent as if fully described herein.

With further reference to our invention as shown on FIG. 1, the speed or rate at which the material 1a and 1b travels to the left is determined by the speed of motor 20 whose shaft 21 is shown connected to the finish reel 6. If desired, the motor 20 may also be connected or coupled by any suitable means to the other rollers, such as 5a and 5b, to control their speed in addition to that of reel 6. This coupling arrangement is diagrammatically illustrated by the dotted line 21a.

The speed of motor 20 is controlled by Motor Controller 22 which may, for example, comprise an autotransfer whose voltage output is determined by the position of shaft or linkage 23 which is connected to a foot pedal 24. Linkage 23 is also connected to the RF Generator Controller 25 which by means of cable 26 applies the input power to RF generator 10. The position of pedal 24, by means of linkage 23, concurrently determines both the speed of motor 20 and the output power of RF Generator Controller 25. This varies the output of generator 10 as the motor speed varies and, in turn, causes the proper amount of heating energy to be applied to the glue 8 as the speed of the material travel is varied.

The details of the RF Generator Controller 25 are shown on FIG. 2. The Controller 25 basically comprises facilities for controlling the voltage output of a bridge rectifier 32 whose output is applied to RF generator 10 to determine the intensity of the RF field developed across electrodes 3 and 4. A saturable reactor 30 has windings 30a and 30b connected in series with the primary winding of transformer 31 whose secondary is connected to the input of the bridge rectifier. The 110 volt source is applied in series through reactor 30 to transformer 31 and the impedance of windings 30a and 30b determines the voltage applied to the primary of the transformer. This, in turn, determines (1) the secondary voltage applied to the rectifier, (2) the output of the rectifier, (3) the output of RF generator 10, and (4) the intensity of the RF field applied by electrodes 3 and 4 to the material 1a and 1b and the glue 8.

The impedance of windings 30a and 30b is controlled by the DC current through winding 30c and the resultant degree of saturation of the reactor field. When the current through winding 30c is sufficient to saturate the reactor, the impedance of windings 30a and 30b is low and substantially all of the 110 volt input is applied to the primary of transformer 31. This causes a maximum output from the rectifier and the RF generator, and a maximum heating power to the glue. When the DC current through winding 30c is low, the impedance of windings 30a and 30b is high and a low AC voltage is applied to the primary of transformer 31. This results in a minimum RF field and a minimum heating power applied to glue 8.

The circuit for control winding 30c comprises the series arrangement of the winding 30c, minimum power rheostat 36, foot pedal control rheostat 35, a maximum power rheostat 37, and the DC source. The setting of rheostat 37 determines the maximum current through winding 30c as the resistance of the foot pedal rheostat is reduced to its minimum. This, in turn, controls the maximum saturation of the reactor and the maximum RF heating. The setting of rheostat 36 controls the minimum DC current when the resistance of rheostat 35 is at a maximum. This, in turn, determines the minimum RF heating field applied to the glue.

The position and, in turn, the resistance of the foot pedal rheostat 35 is determined by the position of linkage 23 and foot pedal 24. The resistance of rheostat 35 is at its maximum when pedal 24 is not depressed. This condition produces the minimum RF heating. The resistance of rheostat 35 decreases as pedal 24 is depressed. This causes the RF heating energy to increase.

Since pedal 24 is connected to both motor Controller 22 and RF Generator Controller 25, the depression of the pedal concurrently increases both the rate of travel of the material and the applied RF heating field. As a result, the glue is heated to the proper temperature regardless of the rate of travel of the material.

The resistance of rheostat 35 may be arranged to vary either linearly or in any desired manner as the pedal is depressed. In many RF generators the change in the power output is related in a quadratic manner to the change in the input voltage over at least a portion of the operating characteristic of the output tube. Accordingly, the rheostat 35 may be wound in the desired manner so that the depression of pedal 24 is proportional or related in any desired manner to the applied RF heating energy.

It is understood that the above-described arrangements are merely illustrative of the application of the principles of the invention. Numerous other arrangements may be devised by those skilled in the art without departing from the spirit and scope of the invention. Thus, an RF Generator has been illustrated as providing the required thermal energy to melt the adhesive. Obviously, any other suitable source of thermal energy could be used if desired.

What is claimed is:

1. A system for joining sheet material comprising:
    feeding means for continuously feeding first and second portions of material along a path to provide face to face contact between said portions of material along a portion of said path and for continuously interfeeding a dry adhesive thread between said portions of material along said portion of said path,
    feeding control means for controlling the rate at which said portions of material are fed along said path,
    pressure means for applying a compressive pressure between said materials along said portion of said path,
    a radio frequency energy source to provide a radio frequency field for heating said adhesive along said portion of said path,
    the magnitude of the heat and pressure applied through said generator and by said pressure means being great enough to cause said heated adhesive to flow sufficiently to join together said portions of sheet material,
    radio frequency energy control means simultaneously variable with said feed control means for controlling the input power to said radio frequency energy source as a function of the rate at which material is being fed by said feed control means to provide a constant predetermined temperature for said adhesive at all rates of material feed, said radio frequency energy control means including:
        a rectifier having its output connected to the input of said radio frequency energy source,
        a transformer having its secondary winding connected to the input of said rectifier,
        a source of AC power,
        a saturable reactor having its secondary windings connected in a series arrangement with said AC source and the primary windings of said transformer,
        a DC control winding on said reactor, and
        means for controlling the magnitude of the DC current through said DC control winding as a function of the rate of material feed.

2. The system of claim 1 wherein said means for controlling the magnitude of the DC currents through said DC control winding comprises:
    a source of DC power, and
    a first variable resistor having means for varying the resistance thereof,
    said DC control winding on said reactor and said first resistor being connected in series to said source of DC power,
    said means for varying the resistance of said first resistor being coupled to said feed control means to vary the resistance of said first resistor simultaneously and inversely as said feed control means controls the rate at which material is fed along said path.

3. The system of claim 2 further comprising:
    a second resistor in series with said first resistor for determining the minimum current through said DC control winding when said first resistor has its maximum resistance value,
    a third resistor connected across the output of said source of DC power and having a tap connected to the series circuit of said first and second resistors and said DC control winding for determining the minimum current through said DC control winding when said first resistor has its minimum resistance value.

4. A system for joining sheet material comprising:
    feeding means for continuously feeding first and second portions of material along a path to provide face to face contact between said portions of material along a portion of said path and for continuously interfeeding a dry adhesive thread between said portions of material along said portion of said path,
    feeding control means for controlling the rate at which said portions of material are fed along said path,
    pressure means for applying a compressive pressure between said materials along said portion of said path, a radio frequency energy source to provide a radio frequency field for heating said adhesive along said portion of said path, The magnitude of the heat and pressure applied through said generator and by said pressure means being great enough to cause said heated adhesive to flow sufficiently to join together said portions of sheet material, and radio frequency energy control means simultaneously variable with said feed control means for controlling the input power to said radio frequency energy source as a function of the rate at which material is being fed by said feed control means to provide a constant predetermined temperature for said adhesive at all rates of material feed.

* * * * *